United States Patent [19]

Freeman

[11] Patent Number: 5,094,034
[45] Date of Patent: Mar. 10, 1992

[54] ENERGY ABSORBING STRUCTURE FOR A VEHICLE DOOR

[75] Inventor: Richard B. Freeman, Oxford, Mich.

[73] Assignee: The Budd Company, Troy, Mich.

[21] Appl. No.: 630,175

[22] Filed: Dec. 19, 1990

[51] Int. Cl.$^5$ .............................................. B60J 5/00
[52] U.S. Cl. ...................................... 49/501; 49/502; 296/146; 296/189; 403/168; 403/334
[58] Field of Search ................... 296/188, 189, 146; 49/502, 501; 403/167, 168, 275, 277, 334

[56] References Cited

U.S. PATENT DOCUMENTS

| | | | |
|---|---|---|---|
| 2,008,352 | 7/1935 | Fegley et al. | 403/277 X |
| 3,367,686 | 2/1968 | Kurz | 403/277 |
| 3,700,076 | 10/1972 | Forsting et al. | 188/371 |
| 3,868,141 | 2/1975 | Johnson | 296/189 |
| 4,328,642 | 5/1982 | Presto | 49/502 |
| 4,388,013 | 6/1983 | Bergheim et al. | 403/277 |
| 4,861,097 | 8/1989 | Wycech | 296/188 |
| 4,866,883 | 9/1989 | Brown et al. | 296/188 X |

Primary Examiner—Margaret A. Focarino
Assistant Examiner—Andrew C. Pike
Attorney, Agent, or Firm—Harness, Dickey & Pierce

[57] ABSTRACT

An energy absorbing structure for a vehicle door includes an elongated resin reinforced member disposed horizontally between the inner and outer panels of a vehicle door. The elongated member includes first and second enlarged ends, each having an outwardly diverging surface. The elongated member is supported at either end by first and second support members which attach to the vehicle door frame. The support members both include female receptacles having a compatible taper which allows them to mate with the respective enlarged end of the elongated member. The energy absorbing structure absorbs energy imparted laterally upon a vehicle door during side impact through deflection of the elongated member and additionally through distortion of the first and second support members.

9 Claims, 3 Drawing Sheets

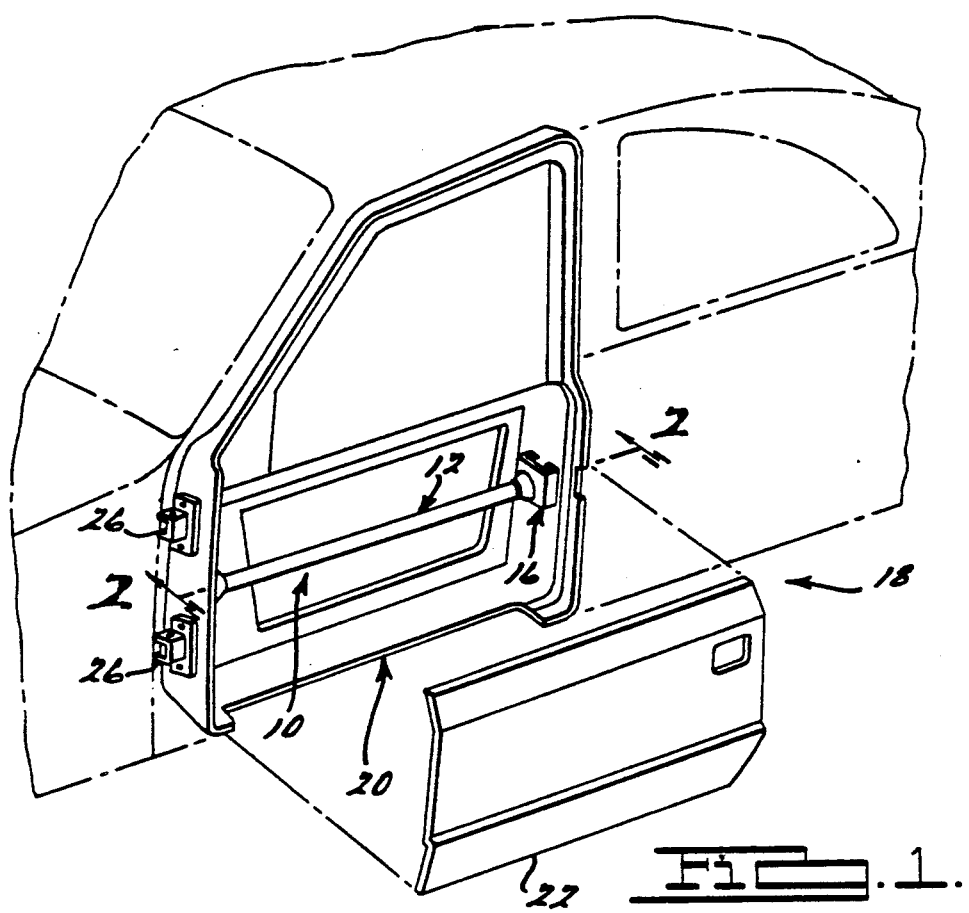
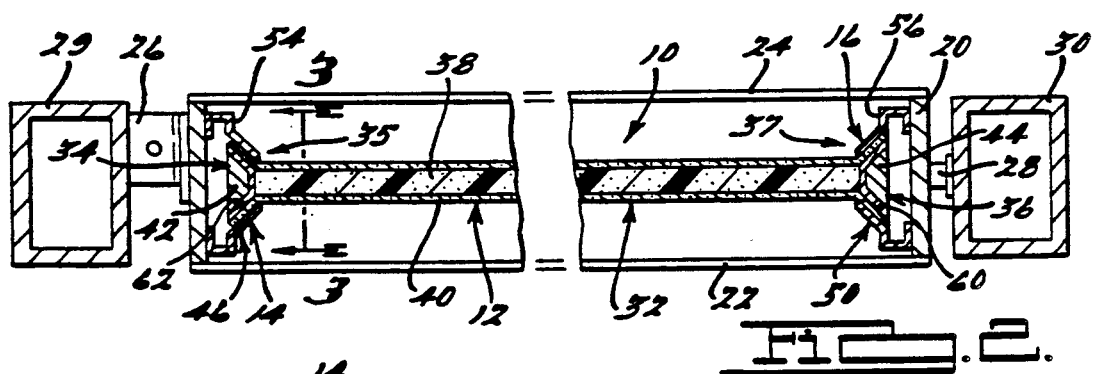
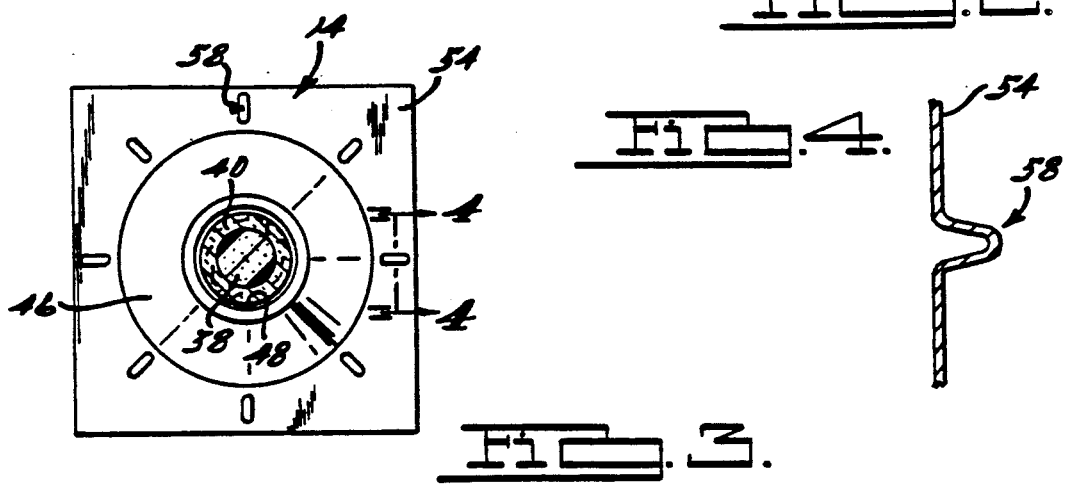

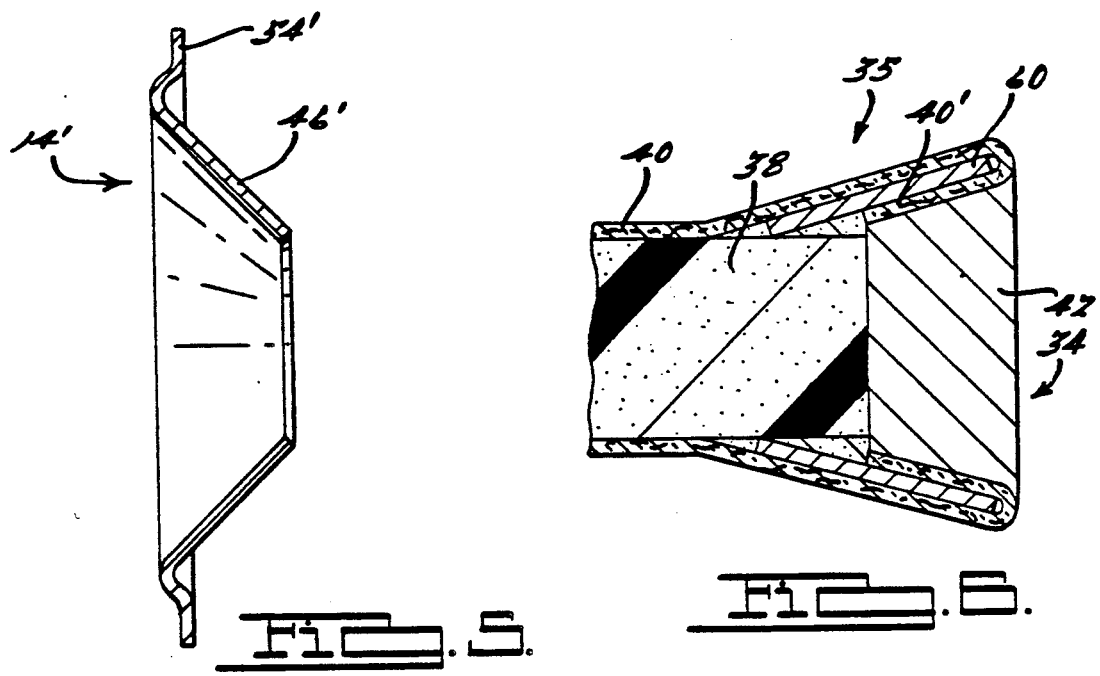
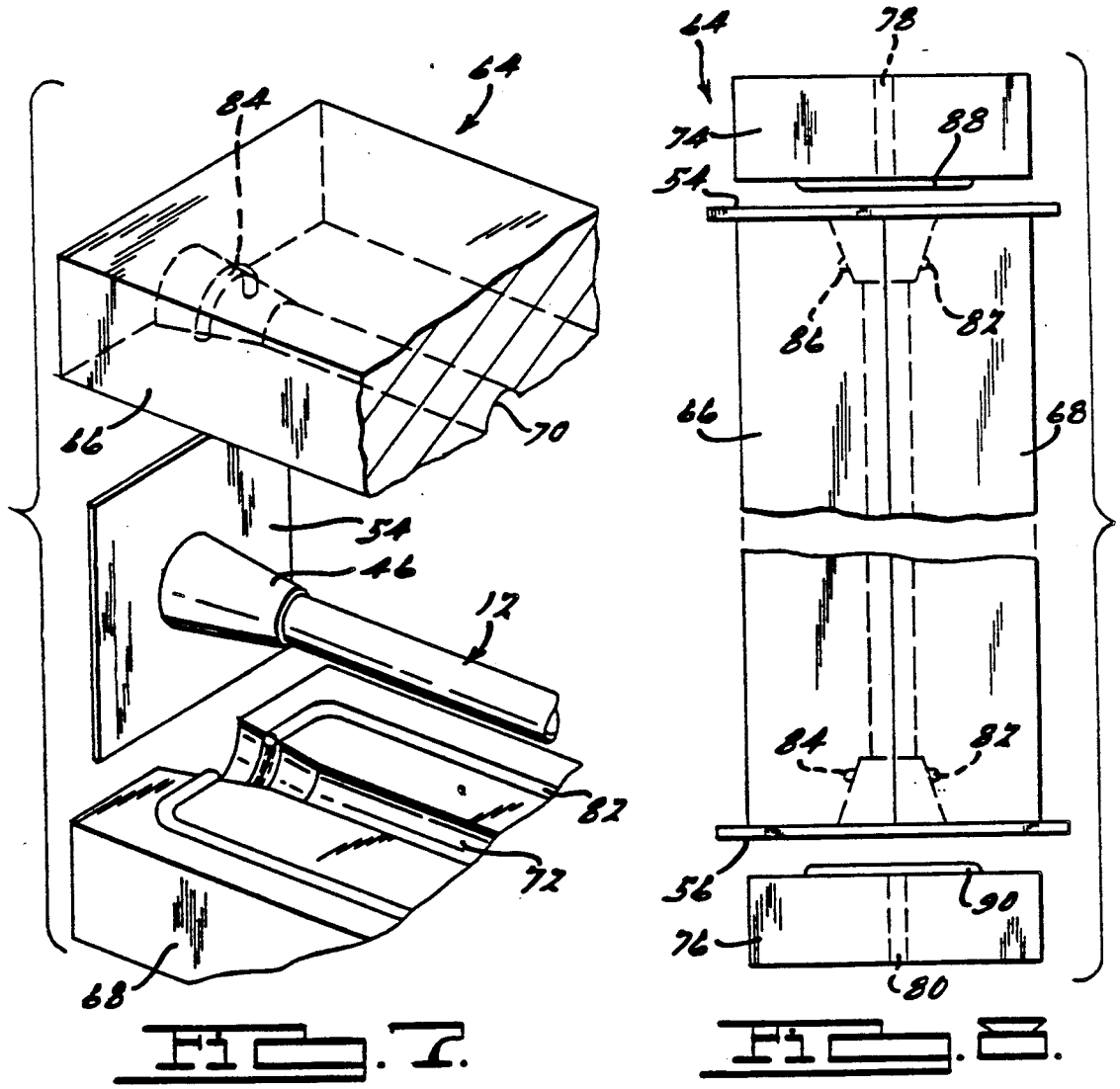

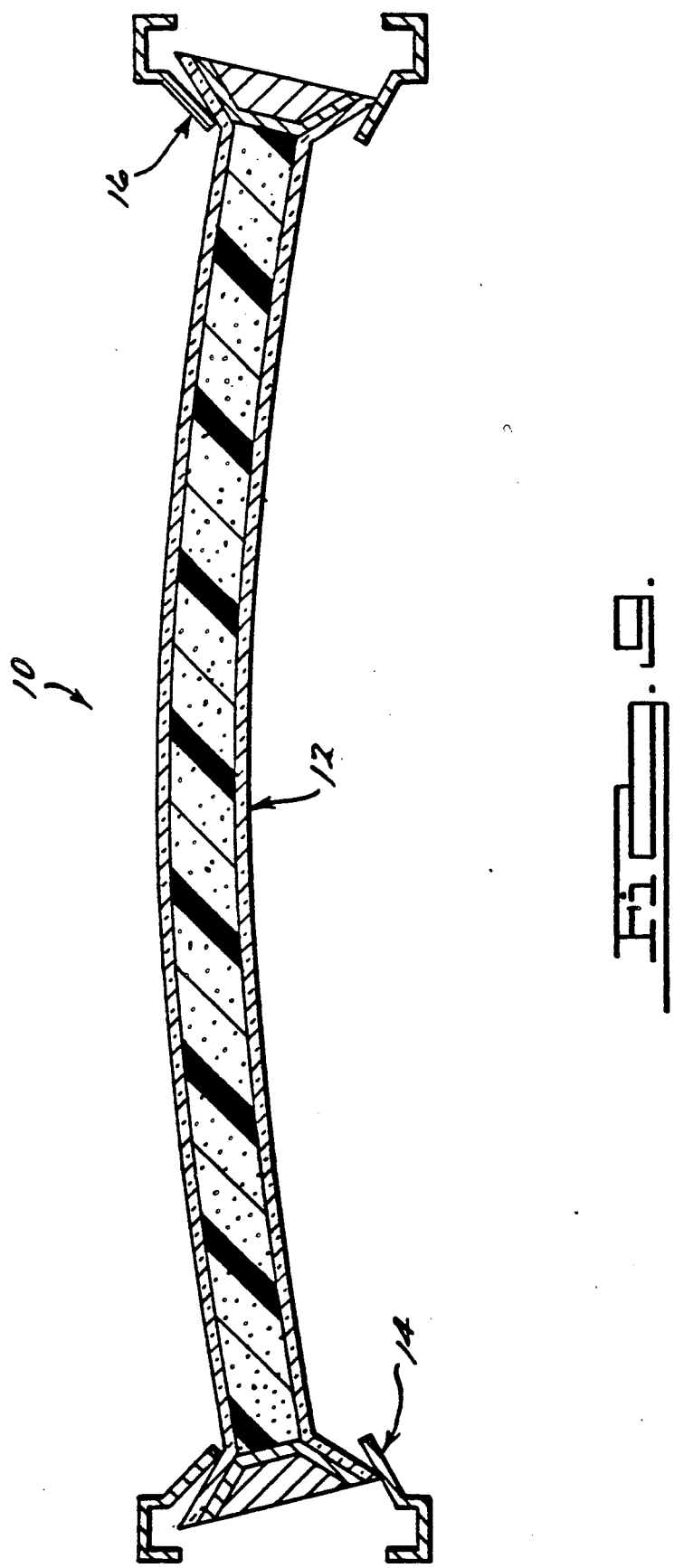

ENERGY ABSORBING STRUCTURE FOR A VEHICLE DOOR

BACKGROUND OF THE INVENTION

1. Technical Field

This invention relates to vehicle safety and, more particularly, to a reinforcing structure for a vehicle door.

2. Discussion

Conventional vehicle doors are generally equipped with a rigid intrusion beam in order to limit penetration resulting from a side impact. This practice has proven successful in meeting prior side impact Federal Motor Vehicle Safety Standards which required a quasi-static test. In the prior test, a pole is slowly forced into the side of a stationary vehicle and the vehicle door is required to meet minimum specified force-deflection characteristics.

Extensive testing done with an anthropomorphic test device (ATD), otherwise known as a crash dummy, has indicated that the prior standard was not representative of actual side impact collisions, and further that compliance with the current standard is not necessarily sufficient to protect the occupant. During a side impact collision, as with other collisions, two impacts occur. When a first car, the striking car, collides with a second car, the struck car, a first impact occurs immediately. Milliseconds later, the second impact occurs in which the occupant and the interior of the vehicle door collide. It is this second impact which directly inflicts injury upon the occupant.

As a result of the prior standard's inability to replicate the results of a side impact collision, an amendment to the side impact standards, adopted Nov. 2, 1990, requires a dynamic test. In this test, a moving barrier, simulating a striking vehicle, would impact a stationary vehicle at a speed of 33.5 miles per hour. Thoracic and pelvic accelerations taken from the ATD would be required to not exceed specified maximums. To meet the requirements of the new amendment, which is scheduled to be gradually implemented begin in model year 1994, vehicle doors must increase their energy absorption capacities.

Several devices used to reinforce vehicle doors from the impact of a side collision are known. U.S. Pat. No. 3,868,141 to Johnson relates to elongated members disposed vertically between the exterior panels of a vehicle door. U.S. Pat. No. 3,700,076 to Forsting et al. relates to an energy absorbing band anchored on the door end walls. U.S. Pat. No. 4,328,642, relates to a stamped intrusion beam attached to the inner door frame of a vehicle.

None of the above-discussed devices is without its problems. While these known devices may have proven satisfactory for applications in the past, their efficiency, cost, methods of manufacture, and energy absorption capacity can be improved.

SUMMARY OF THE INVENTION

The present invention is directed to a reinforcing structure for a vehicle door, a method of reinforcing a vehicle door by partially absorbing the forces resulting from a side impact, and a method of manufacturing the subject reinforcing structure.

In accordance with the teachings of the present invention, there is provided a reinforcing structure for a vehicle door that has an inner door frame with a hinge and latch mechanism and also has inner and outer panels. The reinforcing structure includes an elongated member that has a middle section and first and second enlarged male end members. The reinforcing structure additionally includes two support members for supporting the elongated member at either end. Each support member includes a female receptacle with an aperture. The middle section of the elongated member passes through the apertures in both support members while the male end members of the elongated member mate with the female receptacles and thereby retain the male end members. The reinforcing structure also includes means for connecting the first support member to the frame adjacent the hinge and means for connecting the second support member to the door frame adjacent the latch. In a side impact collision, the reinforcing structure would partially absorb impact forces imparted laterally upon the vehicle door through the deflection of the elongated member and through distortion of the supporting members.

BRIEF DESCRIPTION OF THE DRAWINGS

The various advantages of the present invention will become apparent to those skilled in the art after reading the following specification and by reference to the drawings in which:

FIG. 1 is a partially exploded perspective view of a reinforcing structure made in accordance with the preferred embodiment of this invention shown incorporated into a vehicle;

FIG. 2 is a cross sectional view taken along the lines 2—2 of FIG. 1;

FIG. 3 is a partial cross sectional view taken along lines 3—3 of FIG. 2 which illustrates the preferred orientation of the support member in relation to the male end member and elongated member;

FIG. 4 is a cross sectional view taken along lines 4—4 of FIG. 3 which illustrates a preferred method of providing ribs in the plate-like section of the support member;

FIG. 5 is a cross sectional view of an alternative embodiment of the support member;

FIG. 6 is a partial cross-sectional view of the preferred embodiment of the elongated member;

FIG. 7 is a partial exploded perspective view of a preferred embodiment of the mold used to manufacture the support structure, in an open position; and FIG. 8 is a side view of the mold of FIG. 7 with the top and bottom halves in a closed position; and FIG. 9 is a partial cross section of the reinforcing structure of the present invention illustrating the distortion of the support members.

DESCRIPTION OF THE PREFERRED EMBODIMENT

As generally shown in the drawings, the reinforcing structure 10 includes three main elements: an elongated member 12, a first support member 14, and a second support member 16. The door 18 into which the present invention is to be incorporated may be of traditional construction having a door frame 20, an outer panel 22, an inner panel 24, a hinge mechanism 26, and a latch mechanism 28. The door 18 is designed to be attached between two vertical posts 29 and 30 in a vehicle. Much of the focus of this invention is directed towards elongated member 12 and its support members 14 and 16, and their energy absorbing capabilities.

The elongated member 12 includes a middle section 32 and first and second male end members 34 and 36. In the preferred embodiment, the middle section 32 of the elongated member 12 is constructed of a core of urethane foam 38 covered by a resin impregnated, continuous glass fiber reinforced material 40 oriented parallel to the longitudinal axis of the elongated member 12. The glass fiber reinforced material 40 is sized to provide adequate bending stiffness and strength. Additional glass fiber reinforced material 40 may be required to provide sufficient shear strength for the elongated member 12. This additional material can be randomly oriented, chopped strand mat or oriented continuous glass at various fiber angles. In this example, the cross section of the middle section 32 is circular, although square, rectangular, elliptical, or any irregular geometry should prove to be acceptable.

While in the preferred embodiment the middle section is straight, an alternative embodiment would employ an elongated member 12 having a curved middle section 32. The elongated member 12 will be disposed such that the middle section 32 bows towards the outer panel 22.

The elongated member 12 of the present invention has a first male end member 34 at a first end 35 and a second male end member 36 at the opposite, second end 37. The male end members 34 and 36 have a cross section larger than the cross section of the middle section 32 and in the preferred embodiment are frustoconical with outwardly diverging surfaces. In alternative embodiments, the first and second male end members 34 and 36 could be of any geometry in which the cross section becomes gradually larger as the distance from the middle section 32 increases.

Additionally, in the preferred embodiment the frustoconical first and second male end members 34 and 36 would be hollow. A first end plug 42 would be disposed within the first male end member 34 and a second end plug 44 would be disposed within the second male end member 36. The end plugs 42 and 44 would be securely attached to the male end members 34 and 36 and be of sufficient strength to withstand the compressive forces exerted upon the male end members during deformation of the structure during a side impact collision, as discussed below.

The reinforcing structure 10 of the present invention has first and second support members 14 and 16 which retain the first and second male end members 34 and 36 and thereby support the elongated member 12. Both support members 14 and 16 have female receptacles 46 and 50, respectively, which are integrally connected to a plate-like section. The first support member 14 includes the first female receptacle 46, which has an aperture 48 defined by a tapering surface. The second support member 16 includes the second female receptacle 50, which also has an aperture (not shown) defined by a tapering surface. The diameters of the apertures are the same or slightly larger than the cross section of the middle section 32 of the elongated member 12. In the preferred embodiment, the female receptacles 46 and 50 are cone-shaped with a degree of taper compatible with the outwardly diverging surfaces of the male end members 34 and 36.

The first female receptacle 46 is integrally connected to a first plate-like section 54 and the second female receptacle 50 is integrally connected to a second plate-like section 56. The plate-like sections 54 and 56 are attached directly to the frame 20 of the door 18 by welding or other suitable techniques. For additional reinforcement, the plate-like sections 54 and 56 can be attached to the frame 20 of the door 18, if desired, via steel reinforcement, which is most commonly in the form of metal plates. In such instances, a first such plate (not shown) would be attached to the frame 20 adjacent the hinge mechanisms 26. The hinge mechanisms 26 and the first plate-like section 54 are bolted to this steel reinforcement. Likewise, a second plate (not shown) would be attached to the frame 20 adjacent the latch 28, and the latch and second plate-like section 56 is bolted thereto. Providing these steel reinforcements more efficiently utilizes the reinforcing strength of the two vertical posts 29 and 30.

Referring to FIGS. 3 and 4, ribs 58 can be employed in the plate-like sections 54 and 56 to provide additional stiffness which would prevent premature deformation of the plate-like sections 54 and 56. The ribs 58 would be disposed adjacent to the female receptacles 46 and 50 and extend radially outwardly from the female members 46 and 50.

Turning to FIG. 5, an alternative embodiment of the first support member 14' is depicted in which the tapering surface of the female receptacle 46' extends beyond the plane of the plate-like section 54' and curves upwardly to meet the plate-like section 54'. This alternative embodiment provides another technique to prevent premature deformation of the plate-like sections 54 and 56.

In summary, the entire preferred embodiment of the reinforcing structure 10 of the present invention includes an elongated member 12 having a middle section 32 with a substantially uniform cross section and a urethane foam core 38. The elongated member 12 further has first and second outwardly diverging frustoconical male end members 34 and 36 which are retained by first and second support members 14 and 16, respectively. Each support member 14 and 16 has a female receptacle 46 and 50. The receptacle 46 of the first support member 14 has a first aperture 48 and the receptacle 50 of the second support member 52 has a second aperture (not shown), each slightly larger in diameter than the cross section of the middle section 32, defined by a cone-shaped tapering surface. Each female receptacle 46 and 50 is integrally connected to a plate-like section 54 and 56.

One way to fabricate the reinforcing structure 10 of the present invention would be to use a liquid molding resin impregnation process similar to that disclosed in commonly assigned U.S. Pat. Nos. 4,849,147, 4,863,771 and 4,911,876, which are hereby incorporated by reference. Briefly, such a process would generally begin by wrapping a commercially available combination of unidirectional glass fiber reinforce material 40, containing random chopped reinforcement, around a core of urethane foam 38. The size of the foam core 38 and the amount of reinforcing material 40 wrapped around the core 38 will be dependent on particular design requirements of specific applications. The first end 35 of the elongated member 12, before being enlarged, is next passed through the aperture 48 located in the female receptacle 46 of the first support member 14. The first support member 14, with the outwardly tapering end of the first female receptacle 46 being closest to the end of the elongated member 12, is positioned, temporarily, a sufficient distance from the end of the elongated member 12 so that the male end member 34 can be formed, as described below. Similarly, the second support member 16 is positioned along the elongated member 12 with the second end 37 of elongated member 12 passing through the aperture (not shown) in the second female receptacle 50.

Referring to FIG. 6, a first tapered metal bushing 60 is positioned so that its smaller end is nearer to the middle of the elongated member 12, between the foam core 38 and the glass fiber reinforced material 40 at the first end 35 of the elongated member 12. Excess glass fiber reinforced material 40' is then folded over the end of the first metal bushing 60 to encapsulate it. Alternatively, end plugs 42 and 44 (as shown in FIG. 2) can be disposed with the male end members 34 and 36. The end plugs 42 and 44 would be sufficiently secured to the male end members 34 and 36 to withstand any compressive forces generated during a side impact. Similarly, a second male end member 36 is formed by placing a second tapered metal bushing 62 on the second end 37 of the elongated member 12 between the foam core 38 and the glass fiber reinforced material 40. Excess glass fiber reinforced material, likewise, is then folded over the end of the second metal bushing 62. Next, the female receptacles 46 and 50 of the support members 14 and 16 are pulled outwardly toward their respective end of the elongated member 12, thus mating with the male end members 34 and 36. The assembly is now complete and is placed in a mold 64.

Referring next to FIGS. 7 and 8, the mold 64 utilized to impregnate the glass fiber reinforced material 40 with resin has a top half 66 and a bottom half 68, which close over the main body of the reinforcing structure 10. The two halves 66 and 68 each have channels 70 and 72, respectively, which, when closed, accommodate the elongated member 12 and the female receptacles 46 and 50 of the first and second support members 14 and 16. The mold also has first and second end portions 74 and 76. The first end portion 74 includes a resin inlet 78 and the second end portion 76 includes a resin vent 80.

When the mold 64 is closed, the plate-like sections 54 and 56 of the support members 14 and 16 abut either end of the mold halves 66 and 68. The end-to-end length of the mold halves 66 and 68 is such that it sets the required spacing between the support members 14 and 16 of the reinforcing structure 10. The mold 64 also provides the required parallelism between the elongated member 12 and the support members 14 and 16. A first sealing bead 82 is disposed on the bottom mold half 68 to retain the injected resin 65. This bead 82 is unitary and passes down each length of the channel 72 provided for the elongated member 12 and also passes through each end of the bottom mold half 68, where the female receptacles 46 and 50 are to be positioned. Second and third sealing beads 84 and 86 are disposed on the top mold half 70, across the portions of the channel 70 provided for the female receptacles 46 and 50, respectively. These beads 84 and 86 correspond to the bead portions 82 on the bottom half of the mold 68, adjacent to the female receptacles 46 and 50. Suitable seals 88, 90 are also positioned on inner sides of the first and second mold ends 74 and 76, respectively.

Once the mold 64 is closed, resin is injected into inlet 78 located in the first end portion 74 of the mold 64. Air and excess resin are vented from vent 80 located in the second end portion 76. In this example, the resin is vinyl ester although polyester, epoxy, urethane, and other resins should prove to be acceptable. The resin will fill the interstices within the male end members 34 and 36, as shown in FIG. 6, as well as impregnate and bind the fibers.

The mold 64 remains closed until the resin cures. Curing of the resin can be carried out under heat and pressure or it can be done at room temperature depending upon the resin and its chosen catalyst. Also, the mold halves 66 and 68 can be heated to cure the resin impregnated in the fibrous material 40.

The completed reinforcing structure 10 can now be employed into a vehicle door 18 as depicted in FIG. 1. It should be noted, that while FIG. 1 depicts the reinforcing structure 10 implemented into the driver's side door of a two-door vehicle, the same reinforcing structure 10 could be installed in the passenger's side door or either rear door of a four-door vehicle. The support members 14 and 16 of the present invention preferably attach directly to the inner door frame 20. The first support member 14 attaches to the inner door frame 20 adjacent the hinges 26, while the second support member 16 attaches to the inner door frame 20 adjacent the latch mechanism 28. If required, the support members 14 and 16 can be additionally attached to the door inner panel 24 or the outer panel 22 or both.

In use, the reinforcing structure 10 of the present invention provides a vehicle door 18 with an increased energy absorbing capacity. During a side impact collision, the vehicle door outer panel 22 collapses and the forces of the collision are transferred to the elongated member 12. A portion of the energy transmitted from the impact will be absorbed through the deflection of the elongated member 12. As the elongated member 12 is being deflected, force from the impact is transmitted to the first and second support members 14 and 16. As shown in FIG. 9, when a predetermined minimum tensile load is reached in the elongated member 12, the metal in the first and second support members 14 and 16 begins to distort. Additional energy from the impact is absorbed through this distortion.

Various parameters within the first and second support members 14 and 16 can be altered in order to change the minimum desired tensile load in the elongated member 12 before any distortion of the metal in the support members 14 and 16 occurs. Such parameters include the angle of the female receptacles 46 and 50 and corresponding male end members 34 and 36, the length of the female receptacles 46 and 50 in relationship to the length of the male end members 34 and 36, the thickness of the metal, and the mechanical properties of the metal, as well as the construction of the elongated member 12.

Various other advantages will become apparent to one skilled in the art after having the benefit of studying the specification, drawings and following claims.

What is claimed:

1. An energy absorbing structure for a vehicle door having a door frame with a hinge and a latch mechanism as well as inner and outer panels, the energy absorbing structure comprising:

an elongated member having a middle section and further having first and second enlarged male end members;

a first support member being a thin-walled plate having a first extending female receptacle portion and a base portion, said first extending female receptacle portion having inner and outer surfaces, said inner and outer surfaces of said first extending female receptacle portion both being conically tapered toward an axis of said elongated member at a first end of said first extending portion and having a configuration mating with said first enlarged male end member with an aperture at said first end of said first extending portion for mating with the first male end member, said base portion of said first support member enabling securement to the vehicle door and being positioned transverse to said elongated member, said first support member capable of distorting when a predetermined tensile load is reached in the elongated member; and a second support member being a thin-walled plate having a second extending female receptacle portion and a base portion, said second extending female receptacle portion having inner and outer surfaces, said inner and outer surfaces of said second extending female receptacle portion both being conically tapered toward an axis of said elongated member at a first end of said second extending portion and having a configuration mating with said second enlarged male end member with an aperture at said first end of said second extending portion for mating with the second male end member, said base portion of said second support member enabling securement to the vehicle door and being positioned transverse to said elongated member, said second support member capable of distorting when said predetermined tensile load is reached in the elongated member;

whereby impact forces imparted laterally upon the vehicle door are partially absorbed through deflection of the elongated member and through distortion of the first and second support members.

2. The energy absorbing structure of claim 1 wherein the middle section of the elongated member has a foam core disposed therethrough.

3. The energy absorbing structure of claim 2 wherein the first and second male end members have end plugs disposed therein.

4. The energy absorbing structure of claim 1 wherein the base portions of the first support member has a first plurality of ribs disposed radially to the first extending female receptacle portion and the second support member further has a second plurality of ribs disposed radially to the second extending female receptacle portion.

5. The energy absorbing structure of claim 1 wherein the elongated member is formed essentially from resin impregnated fibrous material.

6. An energy absorbing structure for a vehicle door having a door frame with a hinge and a latch mechanism as well as inner and outer panels, the energy absorbing structure comprising:

an elongated member having an middle section and further having first and second male end members, said first male end members being conical;

a first and a second support member, said first support member being a thin walled plate having an extending female receptacle portion and a base portion, said extending portion having an inner surface and an outer surface, said inner and outer surfaces both being conically tapered toward an axis of said elongated member at a first end and having a configuration mating with said first enlarged male end member with an aperture at said first end for mating with the first conical male end member, said base portion enabling securement to the vehicle door and being positioned transverse to said elongated member, said first support member being capable of distorting when a predetermined tensile load is reached in the elongated member;

whereby impact forces imparted laterally upon the vehicle door are partially absorbed through deflection of the elongated member and through distortion of the first support member.

7. The energy absorbing structure of claim 6 wherein the middle section of the elongated member has a foam core disposed therethrough.

8. The energy absorbing structure of claim 6 wherein the first conical male end member has an end plug disposed therein.

9. The energy absorbing structure of claim 8 wherein the base portion of the first one support member further has a plurality of ribs disposed radially to the female receptacle portion.

* * * * *